June 30, 1936.    W. E. CUNNINGHAM    2,046,018
TESTING APPARATUS FOR AUTOMOTIVE BRAKES
Filed Nov. 12, 1934
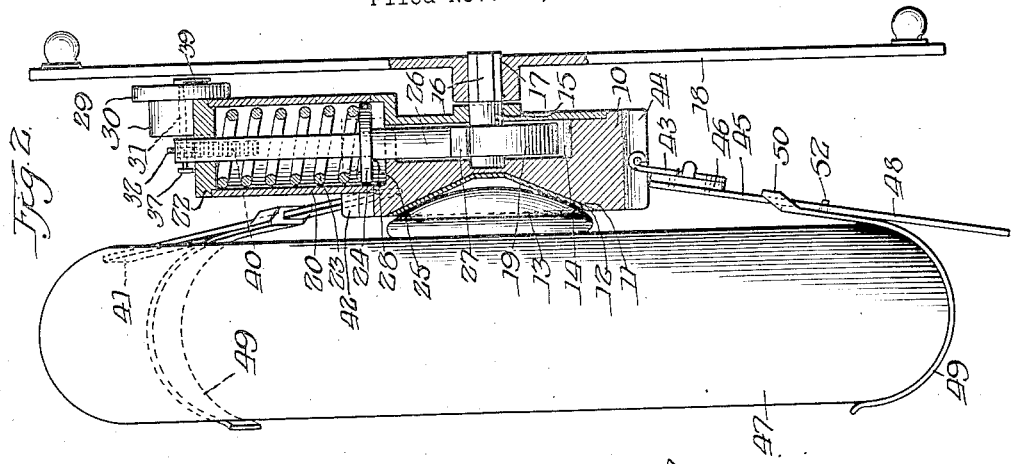
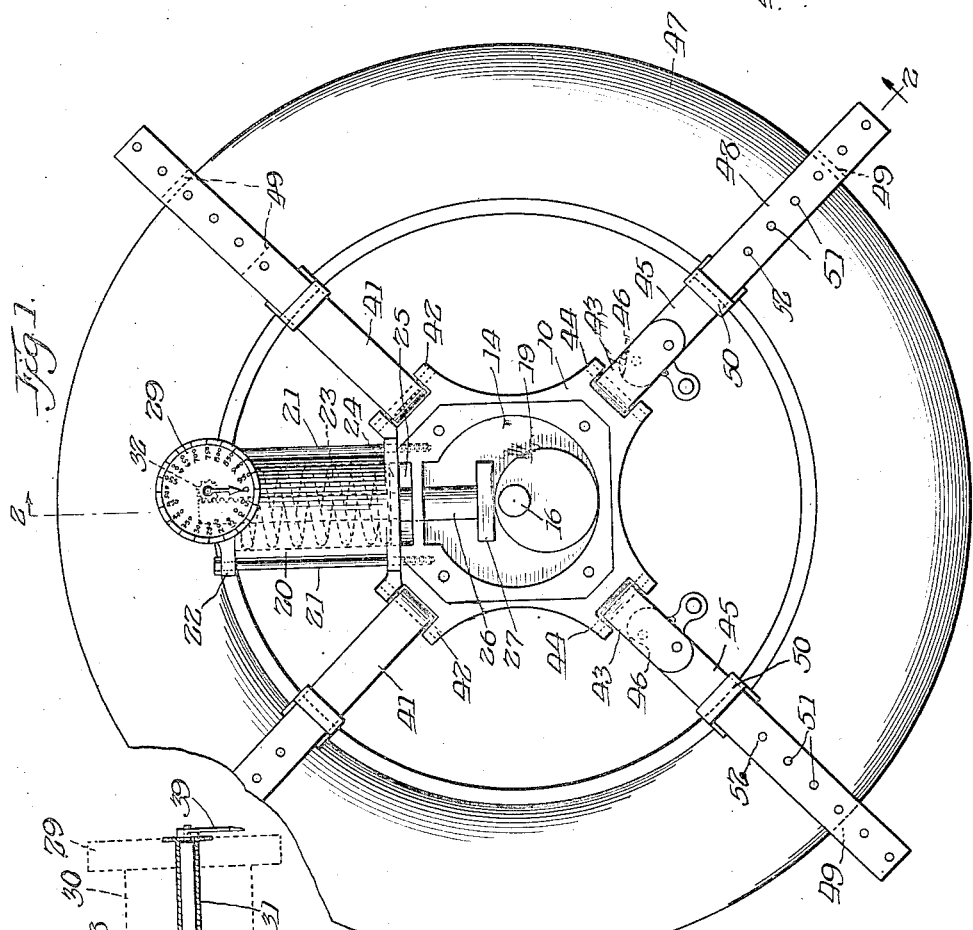
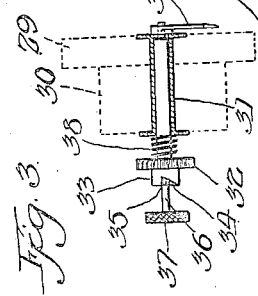
Inventor:
William E. Cunningham
By Wilkinson Huxley Byron & Knight
Attys Patented June 30, 1936

2,046,018

UNITED STATES PATENT OFFICE 2,046,018

TESTING APPARATUS FOR AUTOMOTIVE BRAKES

William E. Cunningham, Highland Park, Ill.

Application November 12, 1934, Serial No. 752,687

2 Claims. (Cl. 265—1)

My invention relates to a testing apparatus for use in connection with the testing of brakes of automobiles, and has for its primary object the provision of an apparatus which is adapted to be secured to the wheels of the automobile after they have been jacked up or otherwise held free of the ground or floor, and force applied thereto through the wheel while the brakes are applied, in such manner that the force necessary to turn a wheel, while the brakes are applied, is registered through the device. By applying the device to the various wheels of the automobile it will be possible, therefore, to adjust the brakes in such manner that the braking force applied to each wheel is equal.

Another and further object of my invention is the provision of a device which is simple to operate, is comparatively cheap to manufacture, and which can be utilized by small garages, individual car owners, and the like, for the purpose of testing brakes should they desire to do so, and adjust them themselves.

Another and further object is the provision of a device which is so constructed that when applied to an automobile wheel the application of force through the device and turning movement is uniform in each instance, thereby attaining uniform results in testing the brake force which is being applied to the brake drums of the automobile through the normal operation of the brakes themselves.

These and other objects of my invention will be more fully and better understood by reference to the accompanying sheet of drawings and in which—

Figure 1 is a front elevational view of my improved invention;

Figure 2 is a sectional view on line 2—2 of Figure 1; and

Figure 3 is a detailed view showing the operation of the registering device secured to the apparatus.

Referring now specifically to the drawing and in which like reference characters refer to like parts throughout, a casing 10 is shown having a frusto-conical recess 11 in one side thereof, with a lining 12 of any suitable material, such as fabric, rubber or the like, to prevent contact with the metal surfaces of the device upon the hub cap of the automobile. The recess 11 is of such type that the member 10 can easily be centered with respect to the hub cap 13 of an automobile wheel, thereby insuring that a force applied to the wheel for turning thereof, as will be hereinafter described, is uniform for each wheel.

The casing 10 has a recess 14 on the outer face thereof and has a shaft 15, the outer end 16 of which is preferably octagonal in shape and adapted to be received in an octagonal shaped opening 17 and the handle member 18, by means of which the device is turned when in operation.

Mounted in the recess 14 on the shaft 15 is an eccentric cam 19 which is adapted to rotate with the shaft 15. At one side of the casing 10 is a tubular extension 20 secured to the main casing by bolts 21, 21 and having an end cap 22 secured thereto or made integral therewith, as may be desired, and having a helical spring 23 mounted therein, the lower end of which is in engagement with a washer 24 adapted to seat in a recess 25 formed in the upper side of the casing 10. Mounted in the tubular extension 20 and having its lower end extending into the recess 14, is a push rod 26 having an enlarged head 27 at the lower end thereof adapted to engage with the eccentric cam 19, and having a reduced upper end portion with an annular shoulder 28 formed thereon intermediate its ends adapted to engage the washer 24 on the under side thereof whereby the spring 23 is compressed by the upward movement of the push rod 26.

Mounted on the cap 22 at the upper end of the device is a pressure registering mechanism comprising a dial 29 having appropriate indicia thereon graduated in such manner as to indicate pressure as measured by the compression of the spring 23. The dial is mounted upon a block member 30 having a casing 31 mounted therein upon which a small gear wheel 32 is mounted having a hub portion 33 in the outer end of which a ratchet notch 34 is formed within which a pin 35, which extends through a shaft 36, is mounted. On the outer end of the shaft 36 is a small finger wheel 37 for resetting the indicator hand, as hereinafter described. The wheel 32 is slidingly mounted upon the shaft 34 and is normally held in outward position by a helical spring 38. On the opposite end of the shaft an indicating hand 39 is mounted which in normal operative position of the device is set at zero. The upper end of the push rod 26 has teeth 40, 40 formed thereon adapted to normally engage in the gear wheel 32 for the purpose of rotating the indicator hand 39 to indicate the pressure applied to the device during its operation.

Attached to two corners of the casing 10 is a pair of links 41, 41, these links being hinged to the casing 10 by means of pins 42, 42 which pass through the ends of the links 41, bent in appropriate manner or otherwise formed to receive the pins 42, each end of the pins passing through projections formed on the casing 10. At opposite sides of the casing 10 are other links 43, 43 which are secured by means of pins 44, 44 to the casing 10 in the same manner as is described for the links 41, these links being similar to links 41 except that they are considerably shorter in length.

Secured to the outer ends of the links 43, 43 are other links 45, 45 with toggle members 46, 46 being secured to the members 43 and 45 respectively, by means of which, after the device is adjusted around the tire 47 of an automobile wheel, the toggles are closed, thereby clamping the device onto the automobile wheel. For this purpose there is secured to the outer ends of each of the links 41 and 45, grip members 48 having curved end portions 49 adapted to conform generally to the curvature of an automobile tire 47. On the inner ends of the members 48 are loops 50 through which the links 44 and 45 on each of the grips are adapted to extend, these members having holes 51, 51 therein into which pins 52, 52, fixed in each of the members 48, are adapted to be received for the purpose of making an initial adjustment of the device to conform to various size automobile wheels. In adjusting these grip members, when the device is removed from the tire it is necessary only to turn the members 48 away from the members 41 and 45 respectively, so that the pins 52 are disengaged from the holes 51, and the grips 48 can thereupon be adjusted to any desired position as the device is applied to an automobile wheel. After this initial adjustment is made the toggle members are placed in one position, and when they are closed the links 45 are drawn inward, thereby effectively clamping the device onto an automobile wheel.

In operation of the device, the automobile preferably is jacked or otherwise lifted free of the ground or floor so that the wheels can be freely rotated, and whatever brake pressure may be necessary applied thereto by means of an appropriate jack placed against the brake pedal, or the pedal can be held down in any approved manner as long as it is held in any predetermined position sufficiently to apply the brakes as much as may be desired. The device is thereupon applied to an automobile wheel as heretofore described, by placing the grip members over the tire and clamping them in position, with the casing 10 centered over the hub cap of the wheel. In its normal position the cam 19 is in its lowermost position, as shown in Figure 1 of the drawing. The handle 18 is thereupon applied to the end 16 of the shaft 15 and a turning force applied thereto, preferably in the normal direction in which the automobile wheel turns, and a continued turning movement rotates the eccentric member 19, placing the helical spring 23 under compression until the resistance of the turning movement of the wheel by the brakes is overcome by the force exerted by the helical spring upon the eccentric member 19, at which point the wheel will begin to move.

In the meantime the teeth 40, 40 engaging with the wheel 32 rotate the indicator hand 39 to a point on the dial where the force applied to the wheel is registered. The handle 18 is thereupon released and the eccentric cam 19 returned to its normal position. The wheel 32 compresses the spring 38 and slides out of engagement with the pin 35 and the device returns to normal position, leaving the indicator hand 39 at its maximum point of indication on the dial. The hand may be left set at this point and the device applied to another wheel until the force is equal to that measured upon this wheel, or the mechanic may note the force applied to this wheel, whereupon by turning the wheel 37 the indicator hand 39 is returned to its zero position.

In this manner the device is applied to each of the wheels of the automobile and braking force tested, and the necessary adjustment made in the brakes to insure uniform braking force being applied equally to all of the automobile wheels. It will be noted that the eccentric member 19 can be turned in either direction so that the device can be applied to automobile wheels on either side of the car, but at the same time it is so placed that the device cannot be turned to make a complete revolution of the cam 19, thereby resulting in possible injury to the operator of the device.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of my invention.

I claim:

1. Apparatus for testing brakes of automotive vehicles, comprising a casing having a frusto-conical recess in one side thereof, a plurality of tire-gripping members secured at their inner ends to said casing and having curved outer ends for engagement with an automobile tire, a shaft in said casing, a rotatable cam in said casing eccentrically mounted on said shaft, a push rod in said casing extending into the path of rotation of said cam whereby the said cam is prevented from making a complete revolution, a spring on said push rod, indicating means actuated by said push rod, and a handle adapted to engage the said shaft on its outer end.

2. Apparatus for testing brakes of automotive vehicles, comprising a casing having a frusto-conical recess in one side thereof, a plurality of tire-gripping arms secured at their inner ends to said casing having curved outer ends, one pair of said arms having toggle connections intermediate their ends, a shaft in said casing, a rotatable cam in said casing eccentrically mounted on said shaft, a push rod on said casing extending into the path of rotation of said cam whereby the said cam is prevented from making a complete revolution, a spring on said push rod, indicating means actuated by said push rod, and a handle adapted to engage the said shaft on its outer end.

WILLIAM E. CUNNINGHAM.